(12) United States Patent
Xu

(10) Patent No.: US 11,242,664 B2
(45) Date of Patent: Feb. 8, 2022

(54) PORTABLE MECHANICALLY ASSEMBLED GROUND FIXATION STAKE DEVICE

(71) Applicant: Shaogang Xu, Dalian (CN)

(72) Inventor: Shaogang Xu, Dalian (CN)

( * ) Notice: Subject to any disclaimer, the term of this patent is extended or adjusted under 35 U.S.C. 154(b) by 0 days.

(21) Appl. No.: 16/768,717

(22) PCT Filed: Apr. 2, 2018

(86) PCT No.: PCT/CN2018/081654
§ 371 (c)(1),
(2) Date: Jun. 1, 2020

(87) PCT Pub. No.: WO2019/104924
PCT Pub. Date: Jun. 6, 2019

(65) Prior Publication Data
US 2021/0172143 A1     Jun. 10, 2021

(30) Foreign Application Priority Data

Dec. 1, 2017   (CN) .......................... 201711252689.7

(51) Int. Cl.
*E02D 5/80* (2006.01)
*E02D 5/52* (2006.01)
*E02D 5/28* (2006.01)

(52) U.S. Cl.
CPC .............. *E02D 5/526* (2013.01); *E02D 5/28* (2013.01); *E02D 5/803* (2013.01)

(58) Field of Classification Search
CPC .... E02D 5/26; E02D 5/28; E02D 5/74; E02D 5/80; E02D 5/803; E02D 27/50; E01F 9/658
See application file for complete search history.

(56) References Cited

U.S. PATENT DOCUMENTS

| 3,604,519 A | * | 9/1971 | Chelminski | ............... | E02D 7/28 |
| | | | | | 173/1 |
| 5,975,808 A | * | 11/1999 | Fujita | ........................ | E02D 5/28 |
| | | | | | 405/244 |

(Continued)

FOREIGN PATENT DOCUMENTS

| CN | 1995552 A | 7/2007 |
| CN | 201649102 U | 11/2010 |

(Continued)

*Primary Examiner* — Benjamin F Fiorello
(74) *Attorney, Agent, or Firm* — Rumit Ranjit Kanakia

(57) ABSTRACT

The portable mechanically assembled ground fixation stake device is applied to the engineering of treating land earthwork, water-based desilting, excavating materials, moving, land, underwater heavy objects, civil engineering, harbor, river, lake construction and the like, and is characterized in that the whole device is fixed only by the action of the working tensile force itself. The whole device has six stake columns 2*a*, 2*b*, 4*a*,4*b*, 9, 1) arranged on the ground, wherein four constituent brackets (2*a*, 2*b*, 4*a*, 4*b*) are supported on the ground. The top ends of the four supports are mounted on the shaft (6), and a cuboid rigid block (15) is mounted in the middle of the shaft (6). When the system is subjected to pulling force, the cuboid rigid block (15) rotates around the central shaft (6), and due to the opposite movement direction of the two end points of the cuboid rigid block (6), the tension conversion direction of the system forms an inclined downward pressure, so that the protective stake (9) is subjected to pressure at the same time from the pressure rod (7), and due to the fact that the tensile force and the pressure are synchronized, the greater the tension force is also increased, so that the whole device achieves the effect of fixing the stake. The device is light in weight and convenient to carry, and can be mounted and disassembled anywhere.

5 Claims, 3 Drawing Sheets

(56) References Cited

U.S. PATENT DOCUMENTS

| | | | | |
|---|---|---|---|---|
| 6,256,942 | B1* | 7/2001 | Schatz | E02D 5/803 |
| | | | | 135/118 |
| 6,435,777 | B1* | 8/2002 | Yoshii | E02D 5/34 |
| | | | | 405/244 |
| 7,736,095 | B2* | 6/2010 | Fujita | E02D 5/805 |
| | | | | 405/244 |
| 9,273,441 | B2* | 3/2016 | Hashim | E02D 5/80 |
| 9,677,296 | B2* | 6/2017 | Smith | E04H 12/347 |
| 2012/0096778 | A1* | 4/2012 | Bauletti | E04H 12/2215 |
| | | | | 52/155 |
| 2014/0174003 | A1* | 6/2014 | Despotellis | E04H 12/223 |
| | | | | 52/169.13 |
| 2017/0089025 | A1 | 3/2017 | Chilson | |
| 2017/0321388 | A1* | 11/2017 | Genest | E04H 12/20 |
| 2020/0071904 | A1* | 3/2020 | Safaqah | E02D 27/50 |

FOREIGN PATENT DOCUMENTS

| | | |
|---|---|---|
| CN | 103669365 A | 3/2014 |
| WO | 2012154724 A1 | 11/2012 |

* cited by examiner

PORTABLE MECHANICALLY ASSEMBLED GROUND FIXATION STAKE DEVICE

TECHNICAL FIELD

According to the invention, the limiting of the invalid part in the composite force is utilized in the engineering mechanics, meanwhile, the principle that the effectiveness can be sequentially transmitted is utilized, and the fixed stake mechanical device capable of bearing large tension under the natural land condition can be constructed.

BACKGROUND OF THE INVENTION

During engineering construction such as civil engineering, earthwork, water conservancy and hydropower, the cables, steel cables or some structural parts are often required to be temporarily fixed, pulling force can be applied at the other end, and corresponding work such as dragging, lifting, reinforcing and the like can be completed. For this purpose, the frequently adopted method is to drive a wood stake or steel stake or concrete underground to the underground as a fixing point, and then connect the cable and the steel cable to the ground. However, due to the pulling force, the wood stake or the steel stake driven into the underground is loosened, or the stake body is pulled out. The concrete stake is a fixed stake, can only be used permanently, cannot be disassembled and moved, and has a lot of inconvenience.

Therefore, the underground stake driving or prefabricated concrete stake is used as a temporary fixing cable and a steel cable method, is not an ideal method, and also can bear no large pulling force, so that the work of larger pulling force cannot be completed, the disassembly and removal can not be carried out, and the adverse effect on construction is caused.

Technical Problem

The temporary cable or steel cable needs to be erected on the site of the engineering construction site, so that the supporting points of the fixed cable or the steel cable must be found; in many cases, the construction site does not have such supporting points; if the stake is staking or prefabricated concrete stakes, the stake is not convenient to move; if the stake is too small, the stake is unstable, the time is wasted, and the stake cannot be moved at will;

Technical Solution

The technical problem to be solved by the invention is to provide a portable mechanically assembled ground fixation stake device which is portable, can be easily installed anytime and anywhere, can be stable and can bear large transverse and oblique pulling force.

In order to solve the above problem, the technical scheme provided by the invention is as follows: the portable mechanically assembled ground fixation stake device is characterized in that the material of the device is composed of a high-strength rigid material, the general condition is steel, the high-strength synthetic material can also be a rigid body which cannot deform. The shape type of the rigid body is not limited, and the rigid body can be round steel, square steel, round pipes, square pipes, H steel, channel steel, corner steel, I-shaped steel, rail steel and the like.

The portable mechanically assembled ground fixation stake device, The four-leg support comprises four steel columns, The top end of the support is connected with a circular shaft, the four-leg support can rotate, a rotatable cuboid block is installed in the middle of the circular shaft, a rigid pressure rod is hinged to one end of the cuboid block, the length of the rigid pressure rod is slightly shorter than the length of the four supports, the rigid pressure rod is hinged to the other protection stake again, and the protection system is stable. A rectangular inner hole is formed in the other end of the cuboid block, a circular shaft is arranged in the hole, a working stake is connected to the round shaft, a cable or steel cable is installed on a lifting ring on the working stake, and the back surface of the working stake is connected to the protective stake through a lifting ring and a cable rope.

The portable mechanically assembled ground fixation stake device provided by the invention has the advantages that the portable mechanically assembled ground fixation stake device can be easily installed at any time and anywhere, can achieve a stable effect, and can bear large transverse and oblique pulling force. It comprises a pair of front leg steel column supports (2a-b), and another pair of rear leg steel column supports (4a-b), and a four-leg support device composed of a shaft (6). A cuboid block (15) is mounted at the middle part of the shaft (6), and the cuboid block (15) acts to pass the direction of the acting force Shaft (6) conversion. The shaft (6) and other rigid parts mounted on the shaft (6) can rotate relative to each other, but do not move axially. In operation, the direction of the acting force is converted through the cuboid block (15). A pressure rod (7) is hinged to the upper part of the cuboid block (15) by a shaft (5), and the length of the pressure rod (7) is slightly shorter than that of the four-leg support. The lower part of the pressure rod (7) is hinged to the protection stake (9) through a shaft (8), and the protection stake (9) plays a role in protecting the system to be stable. The length of the protective stake (9) is selected according to the working condition, and the lower half of the protective stake (9) is inserted into the underground. A rectangular hole is formed in the other end of the cuboid block (15), a circular shaft (3) is arranged in the square hole, and the working stake (1) is connected through a shaft (3). The shaft (3) can drive the working stake (1) to slide and rotate in the rectangular hole of the cuboid block (15). The lower part of the working stake (1) is inserted into the underground. The cable or steel cable (14) is connected to the working stake (1) through a lifting ring (12), a lifting ring (11a-b) is arranged on the back of the working stake (1), and the cable or steel cable (13a-b) is linked to the protective stake (9) through the lifting rings (11a-b, 10a-b). In general, the lifting rings (11a-b) and (10a-b) and (12) are formed at or near the time of installation to form a straight line.

The working stake (1) forms an angle with the ground, and the angle is between 40 degrees and 65 degrees.

The working stake (1) forms a straight line when the cuboid block (15) is mounted.

The position of the lifting ring (10) is mounted between ½ of the position from just exposed to the ground to the lower part of the protective stake (9).

The length of the rear leg steel column bracket (4a-a) exceeds 10% to 100% of the length of the front leg steel column bracket (2a-b), and the length of the front leg steel column bracket (4a-b) is 10% to 100% of the length of the front leg steel column bracket (2a-b); when the rear leg steel column bracket (4a-b) is installed, the length of the front leg steel column bracket (4a-b) is shorter than or equal to that of the front leg steel column bracket (2a-b).

The angle between the front leg steel column support (2a-b) and the rear leg steel column support (4a-b) ranges from 90 degrees to 120 degrees and is selected according to the construction site condition.

The bottom of the rear leg steel column bracket (4A-B) is formed into a hook type of approximately 90 degrees, the hook type portion is inserted underground, and the length is adjustable.

The angle between the working stake (1) and the pressure rod (7) approaches 90 degrees.

The angle between the pressure rod (7) and the protective stake (9) approaches 90 degrees.

The length of the lower part of the working stake (1) is adjusted according to the construction geological condition and the working tension, and the length of the working stake (1) in depth is 1.5 meters to 3 meters in depth when the soil condition is generally dried.

The length of the overground part of the working stake (1) is shorter than that of the underground part.

The included angle between the underground portion and the ground of the protective stake (9) is between 30 degrees and 50 degrees (two different angles are shown in FIG. 2).

The length of the protective stake (9) inserted into the underground part is approximately twice the length of the overground part, for example, the underground part is 2 meters long, and the ground part should be 1 meter long.

The included angle between the connecting cables (13a-b) and the ground is controlled within 45 degrees.

The inclined upward angle formed by the working tension cable (14) and the ground cannot be greater than 45 degrees (less than 40 degrees in actual engineering, and many cases are parallel to the ground) (FIG. 2 shows three different tension directions.).

The tension cable (14) in FIG. 2 represents three pulling direction angles, and when the direction angle is inclined downwards, the formed pulling force is to drive the working stake (1) to move underground; since the working stake (1) does not move horizontally or upwards, the protection function of the stake (9) is not needed, and at this time, the whole system is still in a balanced stable state. When the direction of the tension cable (14) faces in the direction parallel to the ground, the direction of force is transmitted to the working stake (1) through the lifting ring (12), because the working stake (1) is inserted into the soil, due to the action of the soil pressure, a trend (shown in FIGS. 1 and 2) to be inserted into the underground part as the circle center is generated, and the trend is to break the balance stability of the whole system.

As the pulling direction of the working cable (14) reaches or approaches the included angle of the cable (13A-B) and the ground (40 degrees shown in FIG. 1), the system becomes unstable to form the pulled trend, and at this time, the function of the protective stake (9) will be woken up. Firstly, the lifting ring (12) moves towards the acting force direction of the tension cable (14), and the movement is driven by the shaft (3), the cuboid block (15) rotates, the center of the rotation is the shaft (6), and the direction of rotation is counterclockwise (shown in FIG. 2). Since the shaft (5) and the shaft (3) are two end points which do circular motion, the circle center is the shaft (6), so that the tangential direction of the motion is opposite, the speed of the motion along the tangential direction is equal, the magnitude of the acting force is also equal, and the direction is opposite. At this time, when the pulling force generated by the position of the lifting ring (12) is transmitted to the shaft (5) through the shaft (3), the direction of the acting force is changed. At this time, the force generated by the shaft (5) presses against the pressure rod), the pressure of the pressure rod (7) is pressed to the protection stake through the shaft (8).

When the boundary point of the protection stake (9) on the ground and the ground is used as a support point (FIG. 1), since the distance from the shaft (8) to the support point is much larger than the distance from the lifting ring (10) to the support point, the pressure moment generated by the shaft (8) is much larger than the pulling force moment generated by the lifting ring (10).

In addition, due to the soil pressure of the underground soil layer acting on the underground part of the protective stake (9), the greater the downward deeper resistance is. The lifting ring (10) is subjected to pulling force of the rope (13), and meanwhile, the lifting ring (10) transmits the tension to the stake (9), the underground part of the stake (9) applies pressure to the surrounding soil, the pressure is referred to as the activated soil pressure, the soil body is in a sliding stress state according to the Rankine soil pressure theory, and is referred to as a passive Rankine state, and the position of the stress acting point is ⅓ of the underground height of the stake (9).

Assuming that the total length of the protective stake (9) is 3 meters, the underground part is 2 meters, the lifting ring (10) is located at ½ of the underground part of the stake (9) (FIG. 2), that is, when the underground is 1 meter deep, the action point of the soil pressure is ⅓ underground, namely 2×⅓=0.67 meters. At this time, the distance from the tension position of the lifting ring (10) to the action point of the soil pressure is 1−0.67=0.33 m, and the distance between the pressure point generated by the shaft (8) and the action point of the earth pressure of the underground part of the protective stake (9) is 1.33 meters. When the pressure torque at the shaft (8) and the tension moment of the lifting ring (10) are equal, the protective stake (9) is in a balanced and stable state, and according to the moment balance rule, the pressure value at the shaft (8) is only 24.8% of the tension value at the lifting ring (10).

In effect, when the pressure generated at the shaft (8) has not reached 24.8% of the tension value at the hanging ring (10), the protective stake (9) has been in a stable state. This is because, according to the "Building Stake Base Technology Specification" (JGJ94-2008)), When the soil pressure value acting on the stake (9) does not exceed the rated value, the stake (9) which acts as a rigid body is not pulled out.

In addition, when the stake (9) and the ground form a certain angle, when the angle formed by the tension direction and the stake (9) is less than 90 degrees, the stake (9) is simultaneously limited by the pressure of the soil pressure and the pressure rod (7), the stake (9) can only move along the horizontal component force direction of the tensile force of the cable (13), and the component force in the vertical direction of the stake (9) is counteracted by the action of the soil pressure and the pressure of the shaft (8), and the stake (9) is forced to be displaced downward along the angle formed by the ground. The balance stability of the stake (9) is more guaranteed.

As a preferred solution, when the stake is installed. (9) In the case of FIG. 2 (FIG. 2), a dashed line is taken as shown in FIG. 2 (9) As shown in the figure, a rope is arranged in the rope (13) The included angle of the same ground is 41 degrees, and the stake is located (9) The included angle of the same ground is 49 degrees, and the stake is located (9) same rope (13) The included angle between the rope and the rope is 90 degrees (13) When a pulling force is generated, the stake is arranged (9) A thrust is generated, which is the 49 degree angle formed by the ground, which generates displacement that causes the suspension ring (10) A coaxial cable is generated (14) The tension direction of the tension direction of the stake is opposite to that of the tension direction of the stake (9) As the stake (9) moves to any point, the distance from the point to the lifting ring (11) is greater than the length of the cable (13). As the length of the connecting cable (13) is fixed, this point creates a pulling force in the opposite direction of the pulling force of the rope (14). This pulling force prevents the working stake (1) from rotating or displacement, effectively prevents the working stake (1) from loosening and pulling out, or the displacement of the underground shallow soil layer is too large to be stacked, so that the whole device is more balanced and stable;

Beneficial Effects

In actual work, after the structure is adopted, the portable mechanically assembled ground fixation stake device has the following effects that under the condition that no auxiliary external force is applied, only the mechanical transmission principle is utilized, the single working tensile force is effectively converted into the underground pressure, the original effect of acting tension is achieved, and the purpose of strengthening and protecting the device itself can be achieved.

The conversion route of the force is (FIG. 1): when a pulling force is applied to the working cable (14), the working stake (1) is driven by the lifting ring (12) to move in the pulling direction; due to the resistance of the underground soil pressure, the displacement amount is only about 2-6 mm. At the same time, the pulling force drives the shaft (3) to also be displaced in the tension direction by 4-8 mm, and the displacement and the pulling force are transmitted to the device. A shaft (5) at the other end of the cuboid block (15). The position of the shaft (6) is fixed by the brackets (2) and (4), and the distance from the shaft (3) to the shaft (6) is equal to the distance from the shaft (5) to the shaft (6), so the displacement of the shaft (5).

The magnitude of the force is the same as the axis (3), but the direction is opposite. The shaft (5) generates pressure and displacement, and the pressure and displacement are pressed to the uppermost end of the protection stake (9) through the pressure rod (7) and the shaft (8). By means of the lever principle, the displacement of the protection stake (9) in a clockwise direction taking the action point of the underground soil pressure as the circle center can be prevented by the lever principle. The overall balance stability of the device is effectively protected.

BRIEF DESCRIPTION OF THE FIGS

BEST MODE FOR CARRYING OUT THE INVENTION

The invention will be described in detail below in conjunction with the accompanying drawings and embodiments.

The invention relates to a portable mechanically assembled ground fixation stake device, which is applied to fixed stakes of temporary cables, steel cables and steel ropes when being applied to engineering such as land earthwork, water system desilting, excavating materials, moving, land, underwater heavy objects, civil engineering, harbor, river, lake construction and the like. The device is not suitable for being used as a permanent soil stake, a bridge stake, a bridge pier, a suspension cable stake and the like.

The method has the advantages that the size is different, the specification model is different, when the product is used, the appropriate specification model is selected according to the weight of the material during construction, and when the selection is selected, according to the "building stake foundation technical specification" (JGJ94-2008).

According to the preparation process of the specification model of the product, firstly, the whole device is considered to be a rigid body, the pushing force of the whole device during working on the soil pressure is established, and a mathematical model of the critical value accumulated by the surrounding soil is determined. The establishment method of the mathematical model of the soil pressure adopts the Rankine soil pressure theory and the Coulomb soil pressure theory In 5.7 sections of the "building stake foundation technology specification '(JGJ94-2008), a single stake horizontal bearing capacity characteristic value is given.

The large building single-stake foundation and the foundation stake in the group stake with small horizontal load and small horizontal loads should meet the following formula $Hik \leq Rh$ (5.7.1), Requirements:

Hik—the horizontal force acting on the top of the foundation stake I stake under the combination of the load effect standard;

The horizontal bearing capacity characteristic value of the base stake in the Rh-single stake foundation or the group stake is the horizontal bearing of the single stake foundation for the single stake foundation Force characteristic value RHA.

However, in the invention, the portable mechanically assembled ground fixation stake device not only is suitable for horizontal bearing capacity, but also is suitable for the inclined upward bearing capacity within a certain angle (shown in FIGS. 1, 2, 4, 5 and 6).

Figure 1:
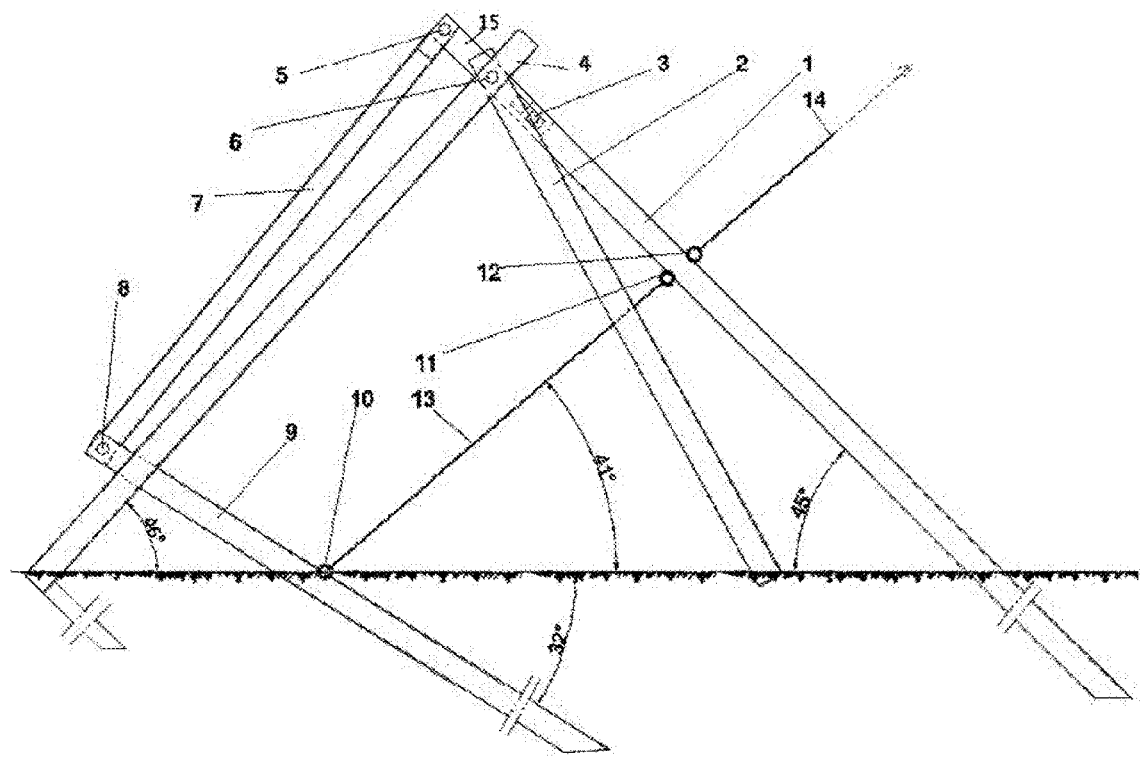
FIG. 1 is a schematic diagram of a basic configuration working state main view of the overall device of the present invention.
Figure 2:
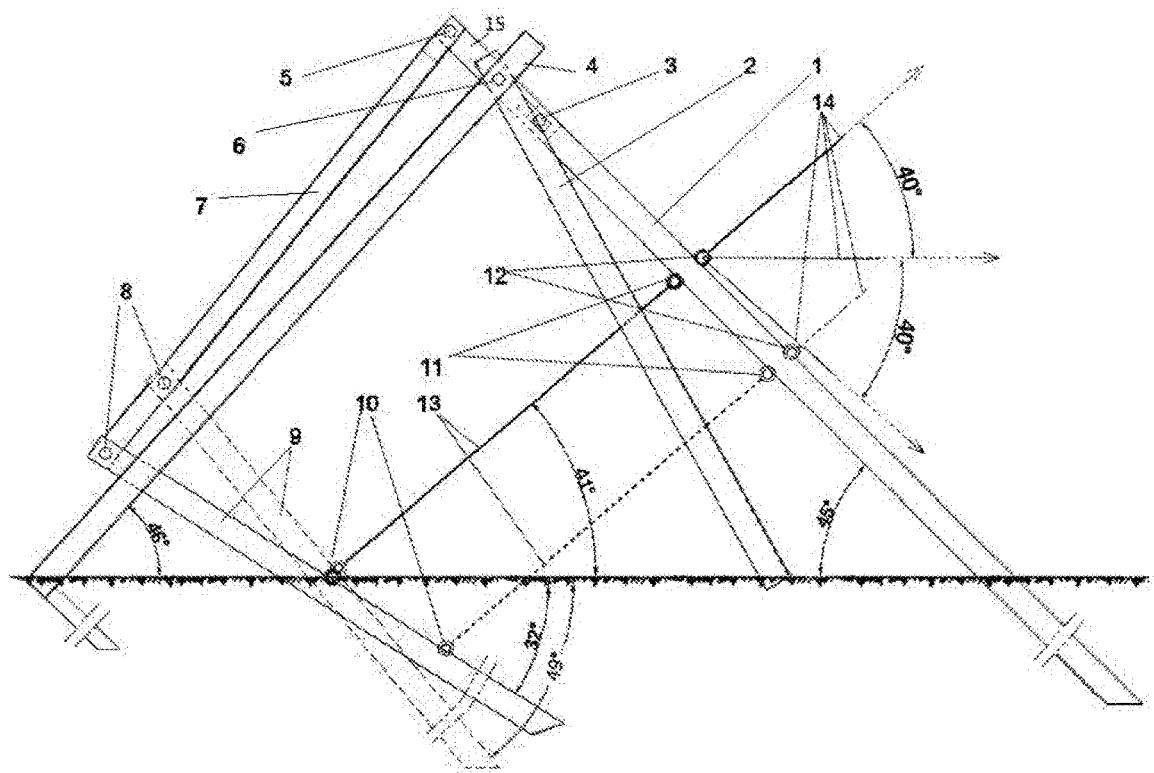
FIG. 2 is a two-(cable tension direction and protection stake position angle) of a main visual diagram of the working state of the overall device of the present invention).
Figure 3:
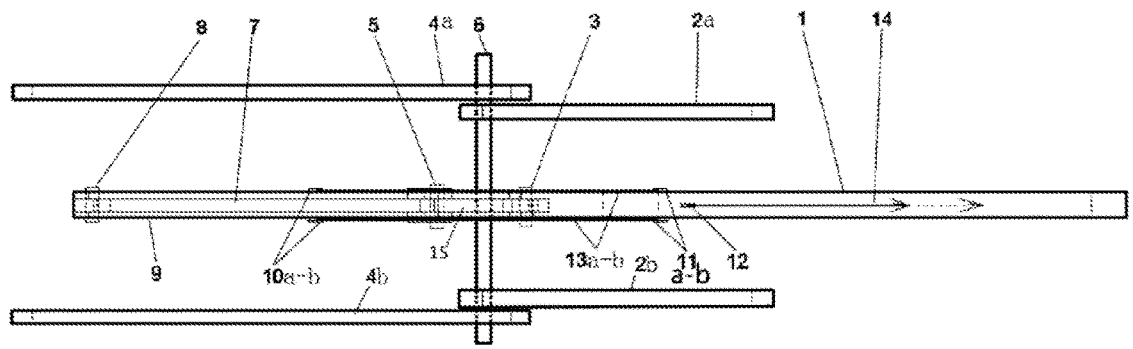
FIG. 3 is a top view of the working state of the overall device shown in FIG. 1.

In combination with FIG. 1, when the bearing capacity is a non-horizontal inclined upward direction, the horizontal dividing force of the bearing capacity is met, that is:

$HIK * \cos \alpha \leq RH$,

In the formula, $\alpha = 41°$ (shown in FIG. 1)

The determination and calculation formula of the horizontal bearing capacity characteristic value of the RH single stake should be 5.7.2 in the "Building Stake Base Technical Specification" (JGJ94-2008). The specification of the section does not need to be listed here.

In the invention, it is to be noted that the portable mechanically assembled ground fixation stake device carries the stake of the working load and is not a stake. It can be seen clearly in connection with FIG. 4 that the common four stakes together bear the working load. Due to the fact that the angle, the length and the length of the four stakes are different, the soil characteristics of the installation site and the like are different, and therefore the method is not suitable for considering the group stake effect.

Through practical application, the total horizontal load is divided into four obtained values to be calculated as the horizontal load of one stake column, the required length and width of a stake column are obtained, the most suitable specification model is selected from the series products of the invention to be assembled and then used.

Preferably, the lifting ring (12) can move up and down along with the change of the direction angle of the load acting force, the smaller the included angle between the acting force direction and the ground, the lower the lifting ring (12) can move downwards, ie, the closer to the ground.

Preferably, the connecting cable (13a-b) can select a single strip or two strips according to the positions of different soil and lifting rings (10a-b). In general, when the lifting ring is at the ground, the lifting ring (10a-b) selects two lifting rings, and when the lifting ring is underground, The cable (10a-b) selects single strip.

Preferably, the four leg brackets (2a-b) and (4a-b) may select three leg brackets (shown in FIG. 5) as desired.

DETAILED DESCRIPTION OF THE INVENTION

The product device is often used on a large-span three-dimensional overhead cableway suspension mining and carrying system in practical application.

Figure 6:
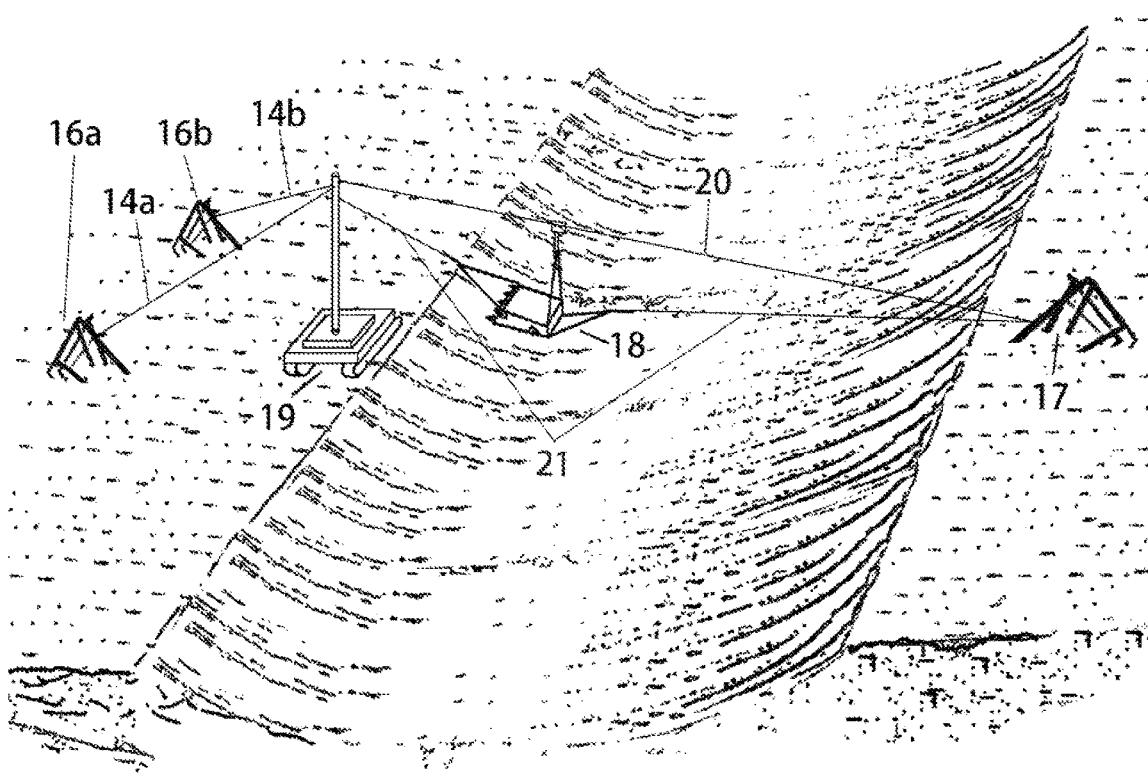
FIG. 6 is a schematic diagram of an erection method of the product of the present invention in an actual earthwork engineering application.

In combination with FIG. 6, the practical application case of the product device in the large-span three-dimensional overhead cableway suspension mining and carrying system is illustrated.

As shown in FIG. 6, the product device and the large-span three-dimensional overhead cableway suspension mining and carrying system are combined and applied to foundation pit engineering with the span exceeding 100 meters.

As shown in the FIG. 16A) In other words, (16B) In other words, (17) According to the product device disclosed by the invention, (19) The main machine of the large-span three-dimensional overhead cableway suspension mining and carrying system is arranged on the host (19) The large-span three-dimensional overhead cableway suspension mining and carrying system is characterized in that (14a), (14b) is the working steel cable connected to the working stake of the device of the invention, and the other end of the working steel cable (14a) and (14b) is connected to the device, The large-span three-dimensional overhead cableway suspension mining and carrying system (19) comprises a lifting arm top end.

FIG. 6 shows a practical case of the product device of the present invention on this engineering.

In the case, the height of the boom of the large-span stereo overhead cableway suspension mining and carrying system (19) is 12 meters, during installation and erection, the product devices (16a), (16b) are connected with the top of the suspension arm of the main machine (19) by steel cables (14a) and (14b), the positions of the three parts form an isosceles triangle, and if the terrain is inconvenient, the error does not exceed 10%, and the connection points on the product devices (16a) and (16b) of the product device (16a) and (16b) are located at the middle part of the respective working stake (1).

The connection (16a), (16b) to the steel cable (14a) at the top end of the suspension arm of the host (19), (14b) forms an included angle of 30 degrees with the ground.

The top end of the lifting arm of the connecting host (19) is connected with the steel cable on the working stake (1) of the product device (17) of the invention. Since the steel cable (20) has some sagging radian, the steel cable (20) near the part of the proximity device (17) is relatively close to the horizontal state, so the connection point can be selected to be located at the bottom of the working stake (1), and the case is selected to be 100 mm above the ground surface.

During work, a winch steel cable (21) of a host of a large-span stereoscopic overhead cableway suspension mining and carrying system (19) is connected The bucket (18) is used for controlling the movement of the bucket (18) to move forward, backward, rising, falling, overturning and the like; at the moment, the working tensile force generated by the steel cable (21) connected with the bucket (18) is transmitted to the product device (16a), (16b) to the working steel cable (14a) and (14b) through the top end of the suspension arm, and the tension direction generated by the working steel cables (14a) and (14b) forms an included angle of 30 degrees with the ground.

In combination with FIG. 6, the portable mechanically assembled ground fixation stake device is characterized in that after the large-span three-dimensional overhead cableway suspension mining and carrying system (19) is assembled and linked, the whole system starts to work once the whole system starts to work. The working steel cables (14a) and (14b) generate a pulling force. As the direction of the working steel cables (14a) and (14b) is inclined upwards, an included angle of 30 degrees is formed on the same ground; therefore, as the working steel cables (14a) and (14b) generate tension. According to the invention, the protection function of the device (16a) and (16b) is woken up, and the reverse pulling force formed by the device (16a) and (16b) acts on the working steel cable (14a) and (14b) as described in the conversion route of the force recorded in the above content. Similarly, the carrying system is suspended by the large-span stereo overhead cableway, and the pulling force applied to the device (17) of the device (17) is also awakened by the steel cables (20) and (21) on the other side to also wake up the automatic protection function of the device (17). At this time, the whole system of assembling and linking the large-span three-dimensional overhead cableway suspension mining and carrying system by three sets of the devices (16a), (16b) and (17) can complete the engineering construction work under the condition of balance safety.

INDUSTRIAL APPLICABILITY

In the practical case, the devices (16a), (16b) and (17) of the present invention select the same type of configuration.

Figure 4:
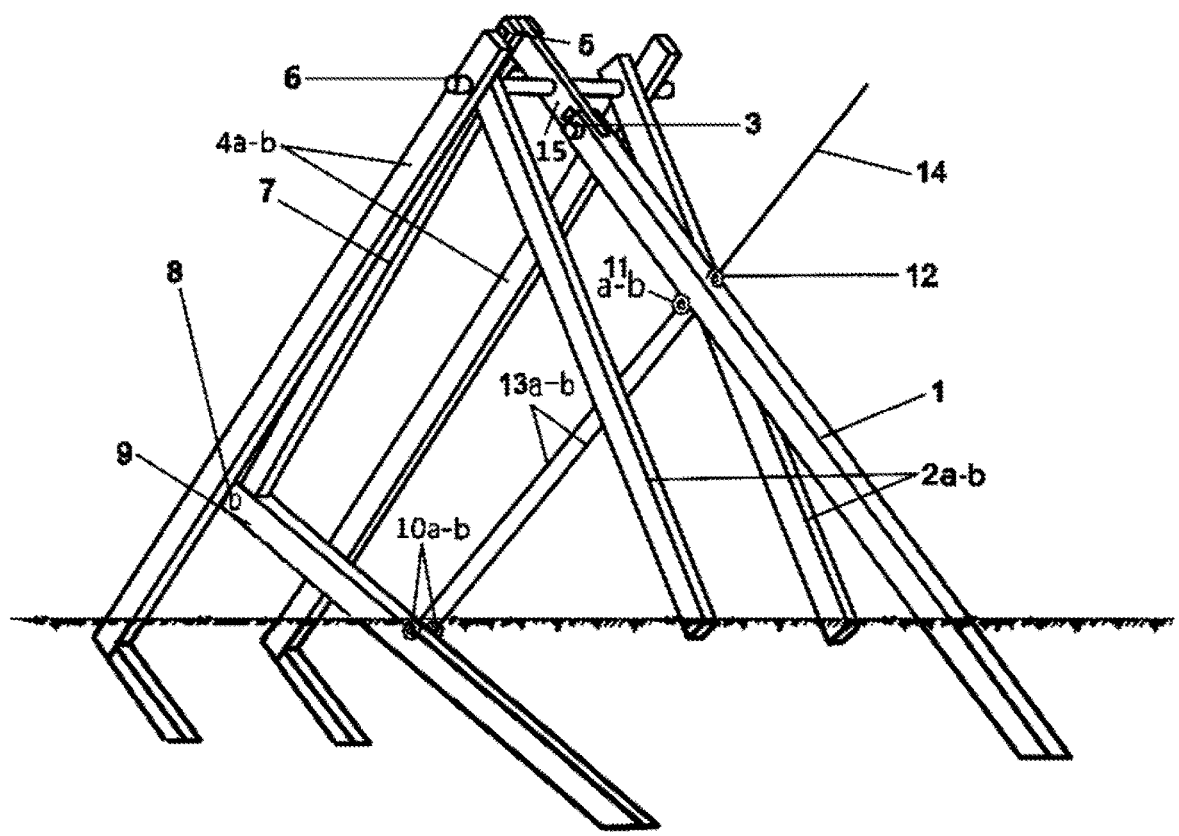
FIG. 4 is a three-dimensional diagram of the basic configuration of the overall device of FIG. 1.

In combination with FIG. 4, the working stake (1), the protective stake (9) selects 20 A channel steel, a bracket (2), (4) and a pressure rod (7) to select 110 angle steel. The total weight of each set of devices is only 260 kg.

As can be seen from the case, the invention has the characteristics of light weight, portability, easy installation, easy disassembly, simple structure, easy production and processing, wide application range and easy mastering on the technology.

The case is only one of the practical cases of the device of the present invention, and the application range is not limited by the use condition of this case, for example: erecting a temporary cableway bridge, erecting a temporary fishing machine, a temporary capstan. As long as the temporary cable needs to be erected, the temporary stake needs to be used to play the role of linking the cable, and a good effect can be achieved by using the temporary stake.

The above description of the invention and the embodiments thereof has not been limited by the description, but is only one of the embodiments of the invention as shown in the accompanying drawings.

Figure 5:
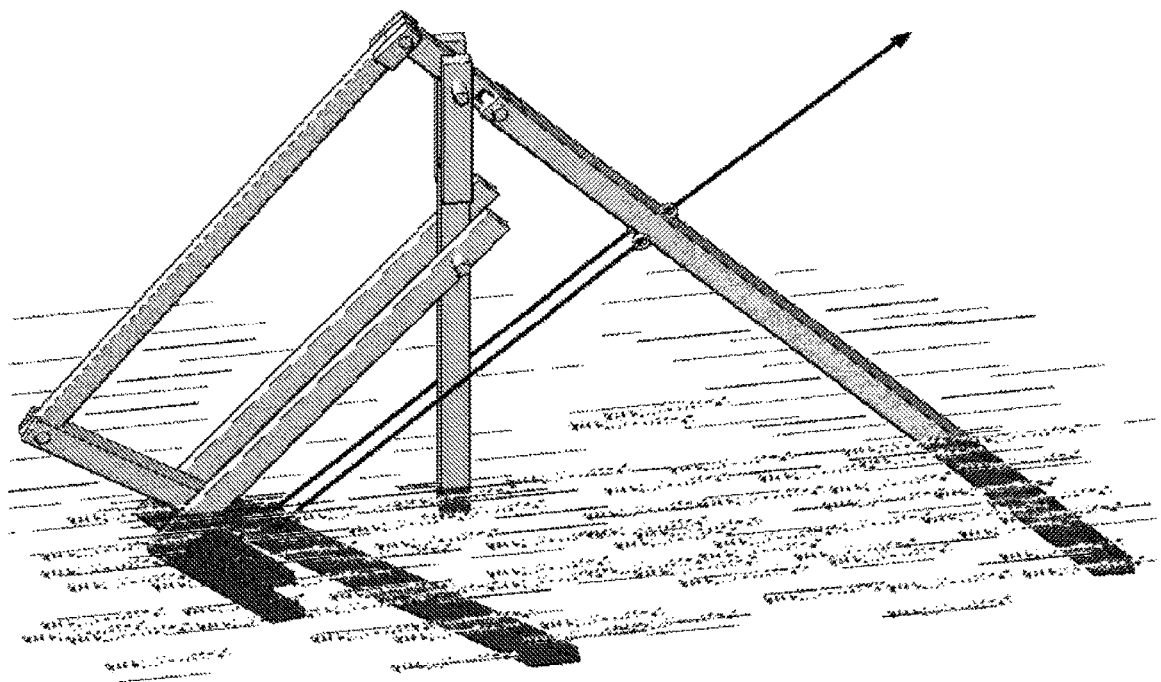
FIG. 5 is a three-dimensional diagram of a three-leg support structure working state according to the present invention.

The actual structure is not limited thereto, and FIG. 5 is a different structural body capable of completing the same work to form a support by using three stake columns.

In summary, if a person of ordinary skill in the art would have been motivated by one of ordinary skill in the art, without departing from the spirit of the invention, a structural mode and an embodiment similar to that of the technical solution are not creatively designed, and all fall within the scope of protection of the present invention.

What is claimed is:

1. A portable mechanically assembled ground fixation stake device comprising:
   a pair of front leg steel column brackets and a pair of rear leg steel column brackets coupled to obtain a four-leg support;
   a rounded shaft coupled to a top end of the four-leg support;
   a rectangular block installed on a middle part of the rounded shaft to play a direction of a transformation force;
   a rigid pressure rod having opposite ends, wherein one end of the rigid pressure rod is hinged to one end of the rectangular block, and wherein the length of the rigid pressure rod is shorter than the length of the pairs of front and rear leg steel column brackets and is used for transferring the transformation force into pressure;
   a protection stack hinged to other end of the rigid pressure rod, the protection stack having a lifting ring wherein the protection stake is longer than the pairs of front and rear leg steel column brackets;
   a rectangular inner hole formed the other end of the rectangular block;
   a circular shaft is arranged in the rectangular inner hole;
   a working stake connected to the circular shaft, the working stake having an upper surface and a back surface opposite to the upper surface, the upper surface having an upper lifting ring and the back surface having a lower lifting ring;
   a first cable or a first steel cable connected to the upper surface of the working stake through the upper lifting ring; and
   a second cable or a second steel cable connected to the back surface of the working stake and is also connected to the protection stake through the down lifting ring and the lifting ring of the protection stake.

2. The portable mechanically assembled ground fixation stake device according to claim 1, wherein the four-legs support configured to rotate relative to each other and restrict to move axially.

3. The portable mechanical combined ground fixing stake device according to claim 1, wherein the pair of front leg steel column brackets and the pair of rear leg steel column brackets are arranged in a triangle and placed on the ground, and the rear leg steel column brackets form about 90 degrees of bending to obtain bent parts, and wherein the bent parts are configured to be inserted into the underground.

4. The portable mechanically assembled ground fixation stake device according to claim 1, wherein the working stake is obliquely downwards inserted into the underground.

5. The portable mechanically assembled ground fixation stake device according to claim 1, wherein the protection stake having an underground part and an overground part, the underground part is obliquely inserted underground, a top end of the overground part of the protection stake is connected with the rigid pressure rod, the upper part of the rigid pressure rod receives the pressure transmitted by the rectangular block, and the pressure is pressed towards the top end of the overground part of the protection stake through the rigid pressure rod.

* * * * *